Jan. 21, 1936.  F. N. BARD  2,028,181
PLUG VALVE
Filed Aug. 29, 1931  3 Sheets-Sheet 1

Jan. 21, 1936.  F. N. BARD  2,028,181

PLUG VALVE

Filed Aug. 29, 1931  3 Sheets-Sheet 2

Inventor:
Francis Norwood Bard
By Paul Carpenter
Atty

Witness:
R. B. Davison

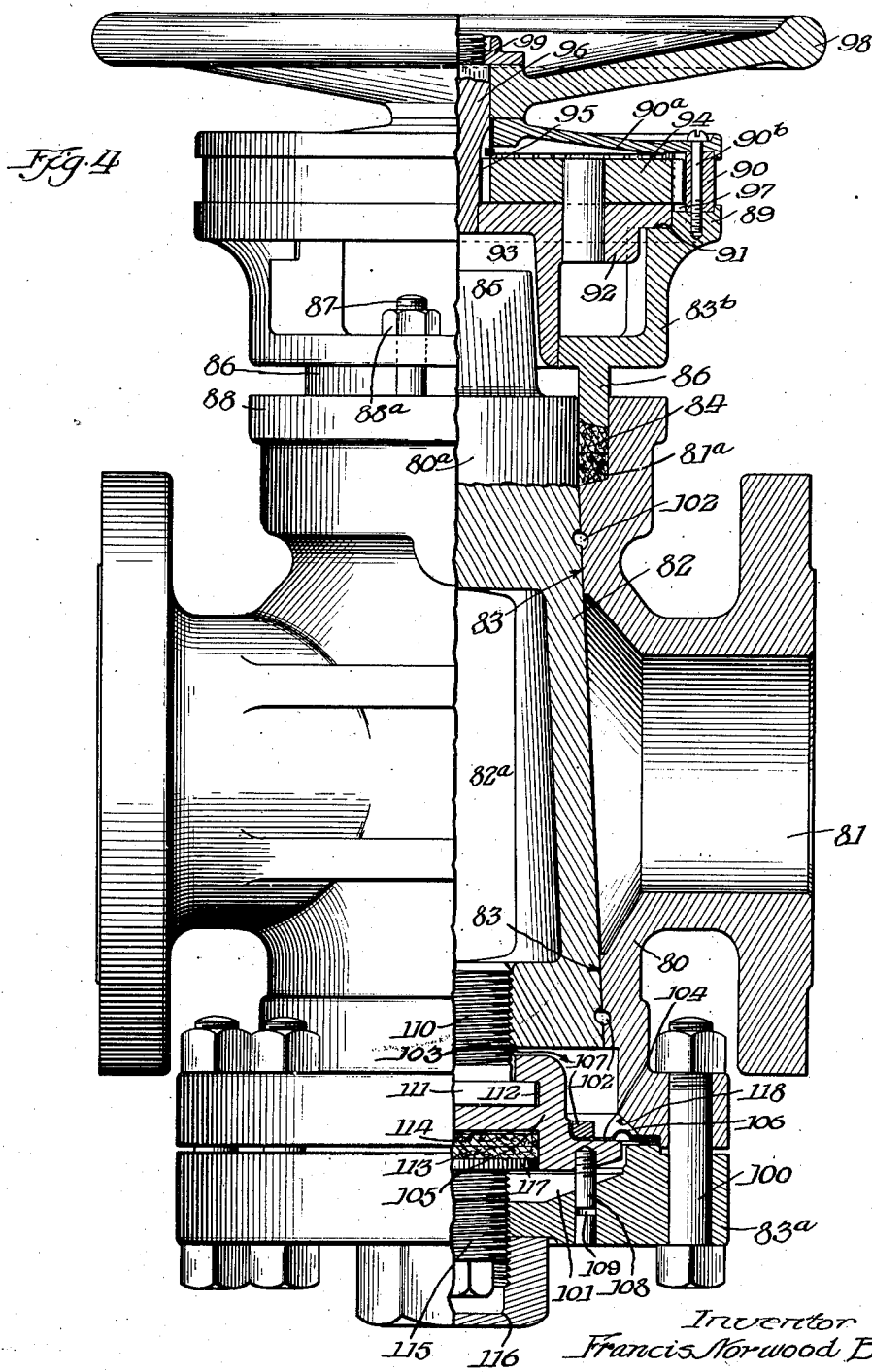

Patented Jan. 21, 1936

2,028,181

UNITED STATES PATENT OFFICE 2,028,181

PLUG VALVE

Francis N. Bard, Highland Park, Ill., assignor to Walworth Patents, Inc., Boston, Mass., a corporation of Massachusetts Application August 29, 1931, Serial No. 560,206

16 Claims. (Cl. 251—91)

This invention relates in general to valves, and more particularly to valves of the rotary plug type, and accessories thereto, the invention incorporating improved means for operating the valve which is capable of installation in new or in existing valve structures.

While in the particular embodiment of the invention illustrated the valve is disclosed as of the well-known rotary plug type, it will be understood that the features of this invention disclosed may be susceptible of modification, within the terms of the invention for adaptation to other forms of valves.

The principal objects and advantages which characterize the present invention reside in the provision of an improved valve structure and a valve operating means therefor; the provision of an improved rotary valve structure and improved operating means therefor; the provision of an improved valve operating mechanism which may, as a unit, be applied to existing forms of valves and which may be detachably associated therewith to facilitate operation of the valve by other means in the event of damage to the operating mechanism; the provision of an improved valve structure of the character referred to wherein the valve may be repacked without the danger of the valve blowing out of the pipe line or its housing; the provision of an improved valve operating mechanism which affords a compact power transmission means permitting larger dimension valves to be operated by hand where relatively small space is available and wherein the application of an ordinary lever to the valve stem is thus prohibited; the provision of an improved valve operating mechanism which permits of a relatively fine degree of adjustment of the valve opening by multiplication of the travel of the valve operating mechanism with respect to the valve; the provision of a self-contained and compact valve operating mechanism which may be readily removed from the valve for replacement or repair; the provision of an improved means for indicating the position of the valve and which indicating means facilitates assembly of the operating mechanism on the valve casing; and the provision, in combination with a rotary plug valve, of an improved gearing of the planetary type for imparting motion to the valve.

This invention further contemplates the provision of an improved means for maintaining the valve and its passageways at an even temperature, such means including a suitable heating unit for application to existing valve structures whereby a heating fluid may be circulated adjacent to the valve for preventing freezing of the valve in its seat or freezing of the fluid contents passing through the pipe line at that point.

This invention also contemplates the employment of the improved valve operating mechanism and improved heating means in conjunction with rotary plug valves, more particularly of the type known as lubricated plug valves wherein lubricant in the desired form is introduced between the surfaces of contact of the valve and its casing.

The foregoing objects and advantages and such other objects and advantages as may appear or be pointed out as this description proceeds, are attained in the several structural embodiments of the invention illustrated in the accompanying drawings in which:

Figure 4 is a view similar to Figure 1 illustrating a still further modified form of my invention.

Figure 1:
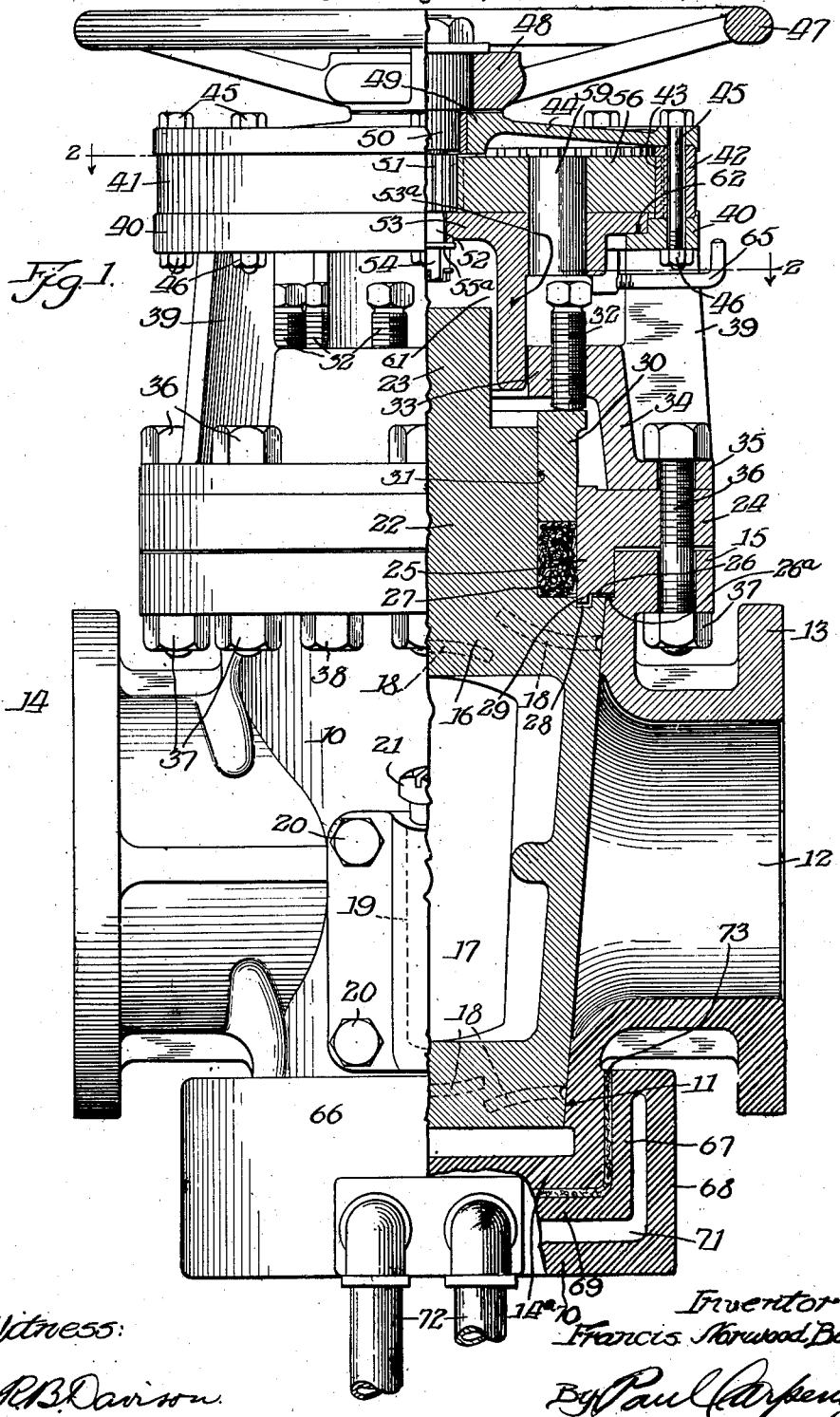
Figure 1 is an elevational view, partly in section, incorporating improvements of this invention.
Figure 2:
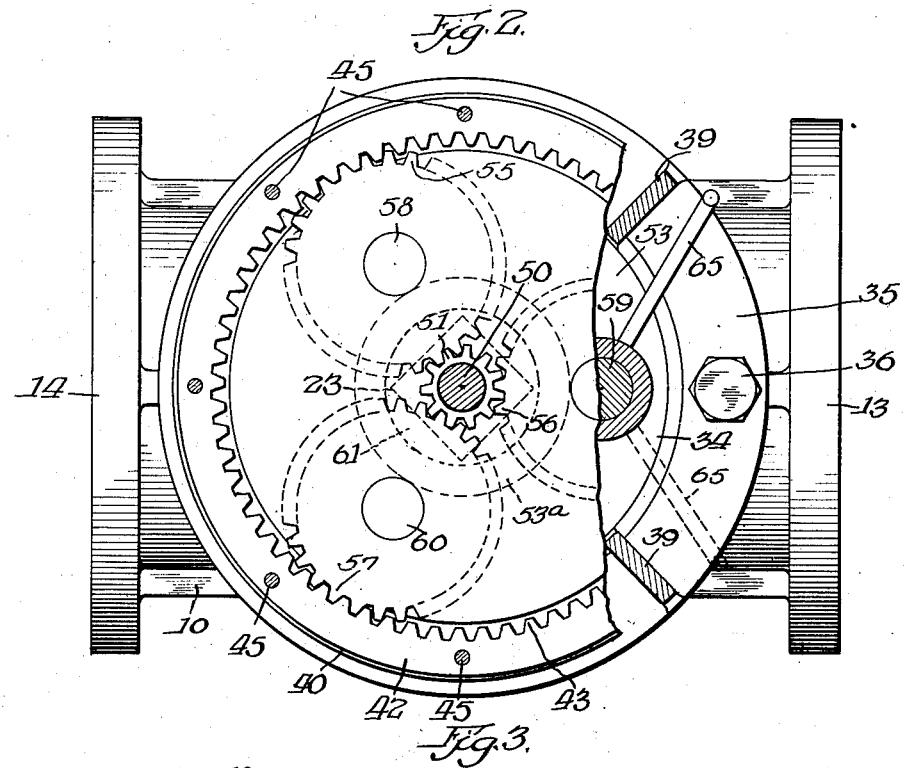
Figure 2 is a transverse sectional view taken on the line 2—2 of Figure 1 looking in the direction indicated by the arrows.

Referring now more paricularly to the drawings and first to the form of the invention disclosed in Figures 1 and 2, I provide a valve housing 10 formed with a generally tapering valve seat 11 extending transversely of the fluid passageway 12, the opposite ends of said passageway terminating in openings bordered by flanges 13 and 14 for facilitating installation of the valve in the pipe line.

Referring to Figure 1, the lower end of the valve seat 11 is closed by a wall 14a, the open end of the valve seat being terminated in an opening bordered by an annular flange 15.

The valve member 16 is generally tapering in form and provided with a transverse aperture 17 which serves to control the flow of fluid through the passageway 12, the wall of the valve member stopping such flow at times.

The valve member seats in the valve seat 11 but may be displaced longitudinally thereof to admit of the introduction of lubricant between the surfaces of contact of the valve and its seat by the provision of a series of grooves 18 formed in the valve member or in the seat, as desired, these grooves being in communication with the lubricant chamber 19, secured to the casing 10 by the provision of bolts or the like 20. This lubricant chamber contains a presser screw 21 whereby lubricant may be forced under pressure between the surfaces of contact of the valve and its seat and thus, as it is said, lift the valve from its seat.

The valve is provided with a reduced extension 22 which projects beyond the flange 15, the extension 22 being further reduced as indicated at 23 to form a polygonal valve stem which serves to engage the valve operating mechanism as will hereafter appear.

A valve retaining member 24 is seated on the flange 15 and projects annularly toward the reduced portion 22, said retaining member 24 having a laterally directed annular flange 25 which overlies a shoulder 26, formed on the larger end of the flange member by virtue of formation of the reduced portion 22. The inner end of the flange 25 is normally slightly spaced from the shoulder 26 as indicated at 26a so as to permit of the longitudinal displacement of the valve hereinabove referred to.

However, in order to prevent leakage when replacing the packing 27, which latter is interposed between the flange 25 and the adjacent surfaces of the reduced portion 22, the shoulder 26 is annularly grooved as indicated at 28 to receive a complemental flange 29 which snugly engages one cylindrical wall of the groove and thus prevents leakage for a sufficient time while repacking the valve.

The packing 27 is preferably of a resilient character so that it will return to proper expanded contacting relationship with the adjacent surfaces after a compression of the packing due to the lubricant lifting the valve from its seat. In order to maintain the packing under compression, I provide a gland member 30, entering between the flange 25 and the wall 31 of the reduced portion 22. This gland is retained and adjusted in compressed position by the provision of a plurality of cap screws 32, 32. These screws are in threaded engagement with the apertured annular flange 33 formed on a bonnet member 34, which latter is formed with a base flange 35 seating upon the valve retaining member 24. In order to retain the valve retaining member 24 and the bonnet member 34 in proper relationship, a plurality of bolts 36 are extended through suitably alined apertures in said elements, nuts 37 serving to retain said bolts.

It will be understood that it becomes necessary, at times, to renew the packing 27. In order to accomplish this purpose, it is necessary that the bonnet member 34 be removed. However, upon removing the bolts 36, the member 24 would lift off the casing by fluid pressure in the passageways 12 were it not for the provision of auxiliary bolts 38 which engage through the flange 15 into the member 24 thus retaining it in position while the bolts 36 are removed from the bonnet member 34. By the provision of a series of said screws 32, the gland 30 may be accurately seated to engage the packing.

The bonnet member 34 additionally performs the functions of supporting the operating valve mechanism, and forms, as it may be said, part of the valve operating mechanism further by provision of a plurality of symmetrically spaced standards 39, 39, whose outer ends are integral with and support an annular bottom member 40. This member 40 is the bottom of the gear casing which latter is generally designated 41. Thus the bottom 40, standards 39 and bonnet member 34 are preferably a single casting carrying the valve operating mechanism and as well the gland adjusting screws so that in order to repack the valve it is only necessary to remove the bolts 36 whereupon the entire valve operating unit may be lifted bodily from the casing 10.

The gear casing 41 includes the bottom member 40 and annular wall 42 having internal gear teeth 43 and a top closure member 44, all secured together by the provision of a series of bolts 45 having nuts 46.

Externally of the gear casing 41, I provide a hand wheel 47 provided with a hub 48 which is adapted to rotate on top of a suitable bearing 49 formed at the center of the cover 44.

The hub 48 of the hand wheel is operatively connected to a shaft 50 which extends through the bearing 49 and is fixedly connected to a pinion 51 having a reduced bearing portion 52, passing through a suitable bearing aperture in the spider frame 53. A suitable nut 54 and washer 55a prevent upward displacement of the pinion and the hand wheel, the nut being locked by a cotter pin.

The pinion 51 forms the sun gear of a planetary gear mechanism including the planet gears 55, 56 and 57, which latter are mounted on suitable bearing studs 58, 59 and 60 carried by the spider frame 53.

It will be observed that the spider frame is provided with a downwardly extending portion 53a suitably recessed at 61 to receive the squared extension 23 of the valve member. The planet gears each at the outer portions of their peripheries are in mesh with the teeth 43 of the casing wall 42 which latter thus forms a ring gear, this ring gear being stationary with the base plate 40 and the cover plate 44. To form a bearing for the spider frame 53, the base plate 40 is annularly internally shouldered as indicated at 62, and the spider, being in the general form of a disc, rides on said shoulder. This arrangement also prevents the entrance of dust to the gear casing.

It will be observed from the foregoing that upon imparting rotary motion to the hand wheel 47, the sun gear will be caused to impart motion to the planet gears which in turn travel around the ring gear thus carrying the spider 53 with them. This movement of the spider rotates the valve from open to closed position or vice versa. In view of the fact that this gearing is employed on large size valves (though equally well applicable to small valves) the ratio of movement of the hand wheel to the movement of the valve is increased thus permitting of the operation of very large valves with facility.

In order to facilitate disposition of the valve casing 41 and bonnet member 34 in proper relationship to the valve either in original assembly or subsequently for repacking of the valve, I provide an indicator arm 65 in engagement with the spider as shown in Figures 1 and 2 and this indicating arm is adapted to move through approximately 90 degrees from open to closed position between certain of the pedestals 39. Suitable indicating plates may be affixed to the base member 40 adjacent to which the arm 65 is adapted to lie in its respective full open or full closed positions of indication.

From the foregoing description it will be observed that owing to the skeleton structure of the bonnet member 34, pedestals 39, whereon the casing 41 is supported, access may be readily had by a wrench or other suitable tool to adjust the said screws 32 or to remove the bolts 36 when removing the valve operating mechanism and bonnet member 34.

It will be observed that dust and other foreign matter are excluded from the interior of the valve and from the gearing by virtue of a downward extension 83a lying snugly against the adjacent portion 33 of the bonnet member 34 and by virtue of the seating of the spider member on the shoulder 62, respectively.

As previously referred to, the type of valve herein described is often employed in localities subject to extremely low temperatures, and in some instances the lubricant employed in the lubrication of the valve member either becomes frozen or so stiff as to prevent or markedly hinder the operation of the valve member. To obviate this I provide a heating jacket generally designated 66 in Figure 1, this jacket being in the form of a cap casting provided with double peripheral walls 67 and 68 which are complemental to bottom walls 69 and 70 thus forming a chamber 71 for containing a heating fluid such as steam or the like. This heating fluid is supplied to and removed from the chamber 71 by the provision of pipes 72.

The cup shaped casting 66 is of such dimension that it readily receives the lower portion 14a of the valve housing. In order to insure a heat conducting contact and to fix the heating unit in position, a suitable cement 73 may be interposed between the heating unit and the end 14a of the valve housing, this cement being heat conductive so that the maximum efficiency of the heating unit is obtained. While a metal to metal contact does not actually exist in the form of the invention shown in Figure 1 between the heating unit and the valve housing, yet highly efficient results are obtained in the employment of this device.

Figure 3:
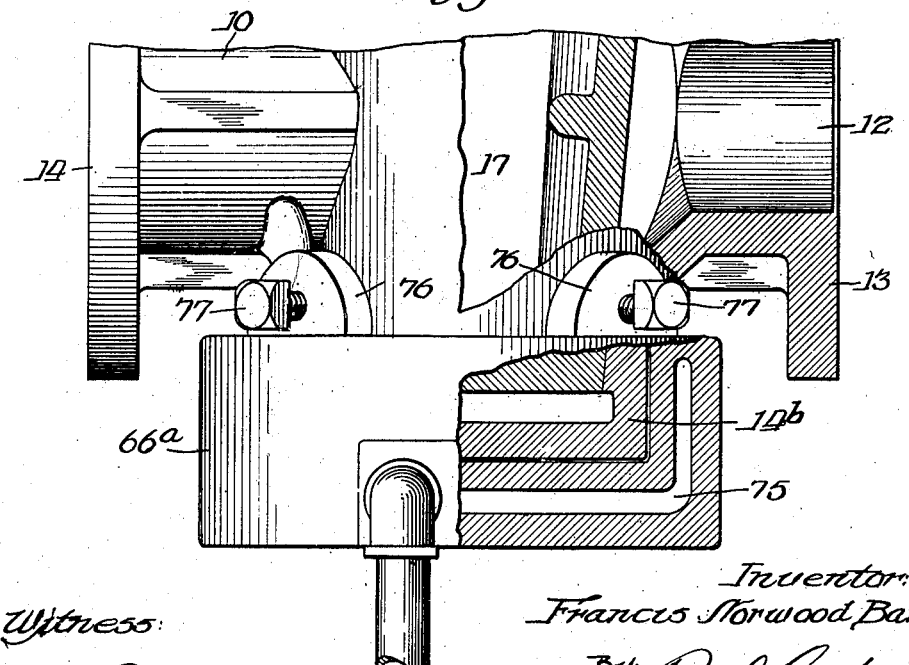
Figure 3 is a fragmentary view, similar to Figure 1, illustrating an alternative form of this invention.

A modification of the form of the heating unit shown in Figure 1 is illustrated in Figure 3 wherein an actual metal to metal contact is afforded between the heating element and the valve housing. The heating element here is indicated at 66a and is provided with a chamber 75 for reception of the heating fluid or a heating unit of any desired kind, the dimensions of the casting 66a being such that it snugly fits the lower end 14b of the valve housing. The heating unit 66a is retained in position in this arrangement by the provision of apertured lugs 76, 76 which extend adjacent to the housing of the valve member, these lug members being cast integrally with the heating unit 66a. Caps screws 77, 77 extend through the threaded apertures in lugs 76 and impinge upon the valve housing thus retaining the heating element in position. In this form of the invention an actual metal to metal contact is formed between the heating unit and the adjacent portion of the valve housing.

Referring now more particularly to the alternative form of this invention shown in Figure 4, I provide a valve body 80 having a fluid passageway 81, controlled by a rotatable tapered plug member 82 having a part 82a and engaging a tapered valve seat 83. The valve seat is open at both ends, being closed at the one end by a closing cap 83a and closed at the other end by the gear box or bonnet 83b forming a gland.

The valve member, at its smaller end, is provided with a projecting axial reduced stem 80a forming, with the wall 81a of the body 80, a stuffing box in which a suitable compressible packing 84 is deposited. The stem is further shaped and reduced and projects beyond the valve body to form a wrench square 85.

In order to compress the packing 84 the bonnet 83b is provided with an annular or cylindrical extension 86 forming a gland which overlies said packing, said bonnet having a plurality of bolts 87 passing therethrough engaged with the flange 88 of the body 80, nuts 88a serving to tighten said gland.

The upper portion of the bonnet is constructed similarly to the bonnet of Figure 1, and comprises a flange portion 89 on which the cylindrical wall 90 seats, said flange having a recess 91 for receiving the spider 92. The spider 92 has a squared recess 93 for engagement over the wrench square 85, and also carries a plurality of planet gears 94 which mesh with a similar gear 95 on the hand wheel shaft 96 and with internal teeth 97 on the wall 90. The wall 90, and a cover plate 90a are held in assembled position by bolts 90b passing therethrough and through said flange 89. A hand wheel 98 is fixedly connected to shaft 96 and retained by a locking nut 99.

The body 80, at the larger end of the valve seat is closed by said plate 83a, which latter is held in position by bolts 100, the plate 83a having a recess 101 therein, so as to afford a space below the adjacent surface of the valve end.

The recess 101 contains means which functions to tend to jack the valve member relatively to its seat in response to lubricant under pressure forced into the grooves 102 by means such as that shown in Figure 1 the lubricant reaching the chamber 103 above said recess formed by the diaphragm 104 and the diaphragm plate 105. The diaphragm 104 at its outer periphery is held by the closure plate 83a and has an arcuate portion 106 facilitating flexing thereof. The inner peripheral edge of the diaphragm is held fixedly to the diaphragm plate 105 by a swedging ring 107. A pin 108 on the plate 105 engages the recess 109 in the closure 83a and prevents rotation of said diaphragm plate, and thus relieves the diaphragm from any twisting or tortional strain.

The diaphragm plate is connected to the valve member by the provision of a bolt 110 screwed into the valve member and having a head 111 rotatively engaging the recess 112 in said diaphragm plate 105.

The valve member is held on its seat normally by the provision of a compressible resilient filler 113 in a recess 114 in the bottom of the diaphragm plate, a compressor screw 115 in the closure plate 83 engaging said filler and being locked in adjusted position by the nut 116. The screw 115 has a pressure plate 117 which engages said resilient filler.

When the lubricant under pressure is in the chamber above the diaphragm 104 it tends to move the diaphragm downwardly as viewed in Figure 4 due to the vertical component of pressure established between the diaphragm and the undercut surface 118 of the chamber. This movement jacks the valve longitudinally of its seat and against the compressible resilient filler 113, thereby permitting lubricant to reach the seating surfaces of the valve.

Owing to the valve operating gearing having a sliding engagement with the valve stem movement of the valve longitudinally will be allowed, the bonnet and gland 86 keeping the valve packed and fluid tight at all times in normal operation.

Having thus described my invention and illustrated its use, what I claim as new and desire to secure by Letters Patent is:

1. In a valve, a body or housing, a valve member moving therein, a valve retaining member on the housing, a packing for the valve adjacent to said retaining member, a gland engaging said packing, a bonnet for the housing overlying said gland, common means for securing the retaining member and bonnet to said housing, means for compressing the gland and packing, said bonnet being bodily removable independently of said retaining member, to permit repacking of said valve, and means for securing the retaining member to the housing independently of the bonnet whereby said retaining member is adapted to hold the valve in the body during the repacking.

2. In a valve, a body or housing, a valve member moving therein, and means for moving said valve including a gearing and a casing therefor connectible as a unit to said body and valve, a part of said casing forming a bonnet for the valve housing, a packing for the valve, a gland for said packing enclosed within said bonnet, and a plurality of set screws on said bonnet for forcing said gland into engagement with said packing.

3. In a valve, a housing having a valve seat, a valve member engaging said seat and movable therein, an operating mechanism for the valve including gearing, a casing for said gearing having a portion forming part of the gearing, and means carried by a movable part of the gearing for indicating the position of the valve.

4. In a valve, a housing having a valve seat, a valve member engaging said seat and movable therein, an operating mechanism for the valve including gearing, a casing for said gearing having a portion forming part of the gearing, said casing being spaced from said housing, and means carried by a movable part of said gearing projecting through said space for indicating the position of the valve.

5. In a valve, a housing having a valve seat, a valve member engaging said seat and movable therein, an operating mechanism for the valve including gearing, a casing for said gearing having a portion forming part of the gearing, said gearing including a spider member connected to operate the valve, said casing being spaced from said housing, and an indicating element on said spider and projecting into view in the space between said casing and housing.

6. In combination, a valve including a body or housing having a valve seat, a valve member engaging said seat and having a portion projecting beyond said housing, an operating mechanism for said valve having a portion engaging the projecting portion of said valve member, a casing for said operating mechanism, means for retaining the valve member against displacement from the housing, said casing having a portion provided with means overlying said valve member retaining means and secured to the housing independently thereof.

7. In combination, a valve including a body or housing having a valve seat, a valve member engaging said seat and having a portion projecting beyond said housing, an operating mechanism for said valve having a portion engaging the projecting portion of said valve member, a casing for said operating mechanism, means for retaining the valve member against displacement from the housing, and a bonnet member on said casing overlying said valve member retaining means and secured to the housing independently thereof.

8. In a valve, a housing, a valve member, movable therein, means for moving said valve member including a gearing and a casing therefor connectible as a unit to said housing and valve member, a part of said casing forming one of the elements of the gearing, a packing for the valve, a bonnet member for the housing secured to said casing and spaced therefrom, and a plurality of adjusting elements for said packing on said bonnet member and accessible through the space between said bonnet member and casing.

9. In a valve, a housing, a valve member, movable therein, means for moving said valve member including a gearing and a casing therefor connectible as a unit to said housing and valve member, a part of said casing forming one of the elements of the gearing, a packing for the valve, another part of said casing forming a bonnet for said housing, a retaining member for the valve member underlying said bonnet member, means to secure said retaining member to the housing independently of the bonnet, to retain the valve member when said bonnet member is removed, and means on said bonnet member for adjusting said packing.

10. In combination, a valve housing having a valve seat, a valve member engaging said seat, a packing at one end of said valve, a gland for compressing said packing tending to hold the valve member on its seat, a retaining member for said valve member abutting said packing, a removable bonnet for said housing overlying said retaining member and said gland, common means for securing the retaining member and bonnet to the housing, means on the bonnet member for compressing the gland and packing, and auxiliary retaining means for said retaining member for preventing its displacement when the bonnet is removed for renewing said packing.

11. In combination, a valve housing having a valve seat, a valve member engaging said seat, a packing at one end of said valve, a gland for compressing said packing tending to hold the valve member on its seat, a retaining member for said valve member abutting said packing, a removable bonnet for said housing overlying said retaining member and said gland, a casing for valve operating mechanism supported by said bonnet, and valve operating mechanism in said casing connected to said valve member.

12. In a valve and a valve operating mechanism therefor, a valve housing having a valve seat, a valve member engaging said seat and having a portion projecting beyond said housing, a bonnet for said housing provided with an annular flange overlying a portion of said valve member, a packing for said valve, means on said flange for compressing said packing, said bonnet having a plurality of spaced pedestals extending outwardly therefrom, a gear casing supported by said pedestals in spaced relation to said bonnet, and a gearing in said casing connected to and for imparting motion to said valve member.

13. In a valve and a valve operating mechanism therefor, a valve housing having a valve seat, a valve member engaging said seat and having a portion projecting beyond said housing, a bonnet for said housing provided with an annular flange overlying a portion of said valve member, a packing for said valve, means on said flange for compressing said packing, said bonnet having a plurality of spaced pedestals extending outwardly therefrom, a gear casing supported by said pedestals in spaced relation to said bonnet, gearing in said casing connected and for imparting motion to said valve member said gear casing having a portion thereof forming part of said gearing.

14. In a valve and valve operating mechanism therefor, a valve housing having a valve seat, a valve member engaging said seat and having a portion projecting beyond said housing, a bonnet for said housing provided with an annular flange overlying a portion of said valve member, a packing for said valve, means on said flange for compressing said packing, said bonnet having a plurality of spaced pedestals extending outwardly therefrom, a gear casing supported by said pedestals in spaced relation to said bonnet, gearing in said casing including a sun gear and a plurality of planet gears, a spider for carrying said gears, and said spider forming a closure for one side of said gear casing and operatively connected to said valve member.

15. A valve structure comprising in combination, a casing having a tapered valve seat, a rotatable valve member adapted to engage said seat and detachably connectible to a member for rotating said valve member, a packing for the valve, a flange on said casing, a housing on said casing supported in a fixed position by said flange, means for compressing said packing without disturbing said housing, and means in said housing for imparting rotation to said valve member.

16. A valve and an operating mechanism therefor, comprising in combination, a body member having a seat, a valve member rotatable in said seat, resilient means tending to hold the valve member to its seat, means for introducing lubricant under pressure between the seating surfaces of the valve and body members for moving the valve member longitudinally in its seat, a bonnet secured to the body member and having a bearing surface, a gearing supporting member rotatable on said bearing surface, a projecting portion on said supporting member adapted to engage a portion of the valve member for imparting rotation thereto through said gearing, said supporting member being spaced from the end of the valve member to permit independent longitudinal movement of said valve member.

FRANCIS N. BARD.